(12) United States Patent
Adefris

(10) Patent No.: US 10,150,900 B2
(45) Date of Patent: Dec. 11, 2018

(54) ABRASIVE PARTICLES AND ABRASIVE ARTICLES INCLUDING THE SAME

(71) Applicant: 3M INNOVATIVE PROPERTIES COMPANY, St. Paul, MN (US)

(72) Inventor: Negus B. Adefris, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/303,309

(22) PCT Filed: Apr. 17, 2015

(86) PCT No.: PCT/US2015/026435
§ 371 (c)(1),
(2) Date: Oct. 11, 2016

(87) PCT Pub. No.: WO2015/164211
PCT Pub. Date: Oct. 29, 2015

(65) Prior Publication Data
US 2017/0037288 A1  Feb. 9, 2017

Related U.S. Application Data

(60) Provisional application No. 61/982,179, filed on Apr. 21, 2014.

(51) Int. Cl.
*B24D 11/00* (2006.01)
*C09K 3/14* (2006.01)
*C01F 7/02* (2006.01)

(52) U.S. Cl.
CPC ............ *C09K 3/1409* (2013.01); *B24D 11/00* (2013.01); *C01F 7/02* (2013.01); *C01P 2004/30* (2013.01)

(58) Field of Classification Search
CPC .......... B24D 11/00; B24D 3/00; C09K 3/1409
See application file for complete search history.

(56) References Cited

U.S. PATENT DOCUMENTS 1,910,444 A   5/1933 Nicholson
3,041,156 A   6/1962 Rowse
(Continued)

FOREIGN PATENT DOCUMENTS

CN    1604834 A    4/2005
CN    101291779 A   10/2008
(Continued)

OTHER PUBLICATIONS

International Search Report for PCT International PCT/US2015/026435 dated Jul. 13, 2015, 3 pages.
(Continued)

*Primary Examiner* — Pegah Parvini
(74) *Attorney, Agent, or Firm* — Bradford B. Wright

(57) ABSTRACT

A ceramic shaped abrasive particle bounded by a base surface having a perimeter, contiguous sidewalls abutting the perimeter, and a multifaceted surface comprising contiguous facets. Each of the contiguous sidewalls abuts the perimeter, and collectively the contiguous sidewalls abut the perimeter in its entirety. Adjacent pairs of the contiguous sidewalls abut each other along respective corner edges. The multifaceted surface is spaced apart from the base surface by the contiguous sidewalls. At least one V-shaped groove extends from one of the corner edges across the multifaceted surface to one of the contiguous sidewalls that does not contact that corner edge. Less than ten percent of the multifaceted surface area is parallel to the base surface. Pluralities of the shaped abrasive particles and coated abrasive articles including them are also disclosed.

19 Claims, 5 Drawing Sheets

(56) References Cited

U.S. PATENT DOCUMENTS

| | | |
|---|---|---|
| 4,314,827 A | 2/1982 | Leitheiser |
| 4,518,397 A | 5/1985 | Leitheiser |
| 4,623,364 A | 11/1986 | Cottringer |
| 4,652,275 A | 3/1987 | Bloecher |
| 4,734,104 A | 3/1988 | Broberg |
| 4,737,163 A | 4/1988 | Larkey |
| 4,744,802 A | 5/1988 | Schwabel |
| 4,751,138 A | 6/1988 | Tumey |
| 4,770,671 A | 9/1988 | Monroe |
| 4,799,939 A | 1/1989 | Bloecher |
| 4,881,951 A | 11/1989 | Wood |
| 4,960,441 A | 10/1990 | Pellow |
| 4,997,461 A | 3/1991 | Markhoff-Matheny |
| 5,009,675 A | 4/1991 | Kunz |
| 5,011,508 A | 4/1991 | Wald |
| 5,042,991 A | 8/1991 | Kunz |
| 5,078,753 A | 1/1992 | Broberg |
| 5,085,671 A | 2/1992 | Martin |
| 5,139,978 A | 8/1992 | Wood |
| 5,152,917 A | 10/1992 | Pieper |
| 5,164,348 A | 11/1992 | Wood |
| 5,201,916 A | 4/1993 | Berg |
| 5,203,884 A | 4/1993 | Buchanan |
| 5,213,591 A | 5/1993 | Celikkaya |
| 5,366,523 A | 11/1994 | Rowenhorst |
| 5,378,251 A | 1/1995 | Culler |
| 5,417,726 A | 5/1995 | Stout |
| 5,429,647 A | 7/1995 | Larmie |
| 5,435,816 A | 7/1995 | Spurgeon |
| 5,436,063 A | 7/1995 | Follett |
| 5,496,386 A | 3/1996 | Broberg |
| 5,498,269 A | 3/1996 | Larmie |
| 5,520,711 A | 5/1996 | Helmin |
| 5,547,479 A | 8/1996 | Conwell |
| 5,551,963 A | 9/1996 | Larmie |
| 5,609,706 A | 3/1997 | Benedict |
| 5,611,829 A * | 3/1997 | Monroe .............. C04B 35/1115 501/128 |
| 5,672,097 A | 9/1997 | Hoopman |
| 5,725,162 A | 3/1998 | Garg |
| 5,766,277 A | 6/1998 | De Voe |
| 5,851,247 A | 12/1998 | Stoetzel et al. |
| 5,946,991 A | 9/1999 | Hoopman |
| 5,954,844 A | 9/1999 | Law |
| 5,961,674 A | 10/1999 | Gagliardi |
| 5,975,987 A | 11/1999 | Hoopman |
| 5,975,988 A | 11/1999 | Christianson |
| 5,984,988 A | 11/1999 | Berg |
| 6,054,093 A | 4/2000 | Torre, Jr. |
| 6,077,601 A | 6/2000 | DeVoe |
| 6,129,540 A | 10/2000 | Hoopman |
| 6,228,133 B1 | 5/2001 | Thurber |
| 6,277,161 B1 | 8/2001 | Castro |
| 6,364,747 B1 | 4/2002 | Gagliardi |
| 8,142,531 B2 | 3/2012 | Adefris |
| 8,142,532 B2 | 3/2012 | Erickson |
| 8,142,891 B2 | 3/2012 | Culler |
| 8,425,278 B2 | 4/2013 | Culler |
| 2004/0020133 A1 | 2/2004 | Paxton |
| 2005/0137077 A1 | 6/2005 | Bange |
| 2009/0165394 A1 | 7/2009 | Culler |
| 2009/0169816 A1 | 7/2009 | Erickson |
| 2010/0146867 A1 | 6/2010 | Boden |
| 2011/0053460 A1 * | 3/2011 | Culler .................... B24D 11/00 451/28 |
| 2012/0167481 A1 | 7/2012 | Yener |
| 2012/0227333 A1 | 9/2012 | Adefris |
| 2013/0040537 A1 | 2/2013 | Schwabel |
| 2013/0125477 A1 | 5/2013 | Adefris |
| 2013/0199105 A1 | 8/2013 | Braun |
| 2013/0212952 A1 | 8/2013 | Welygan |

FOREIGN PATENT DOCUMENTS

| | | |
|---|---|---|
| CN | 101717615 A | 6/2010 |
| CN | 102245730 A | 11/2011 |
| GB | 986847 | 3/1965 |
| JP | 2002-511345 | 4/2002 |
| WO | WO 2013-151745 | 10/2013 |
| WO | WO 2014/020075 A1 | 2/2014 |
| WO | WO 2014-070468 | 5/2014 |
| WO | WO 2015-073258 | 5/2015 |

OTHER PUBLICATIONS

Extended European Search Report, EP15783341.9, dated Nov. 21, 2017, 3 pages.

* cited by examiner

US 10,150,900 B2

ABRASIVE PARTICLES AND ABRASIVE ARTICLES INCLUDING THE SAME

BACKGROUND

Abrasive particles and abrasive articles made using them are useful for abrading, finishing, or grinding a wide variety of materials and surfaces in the manufacturing of goods. As such, there continues to be a need for improving the cost, performance, or life of the abrasive particles and abrasive articles in which they are incorporated.

Shaped abrasive particles and especially ceramic shaped abrasive particles (e.g., made of alpha alumina) have revolutionized the abrasives industry over the past 10 years or so. Shaped abrasive particles have non-random shapes imparted by the way in which they are made. Shaped abrasive particles, in general, can have superior performance as compared to randomly crushed abrasive particles. By controlling the shape of the abrasive particle it is possible to control the resulting performance of abrasive articles in which they are incorporated.

According to one common method, described in U.S. Pat. Appln. Publ. No. 2011/0146867 A1 (Boden et al.) alpha alumina shaped abrasive particles having grooves can be made from a dispersion of aluminum oxide monohydrate that is gelled, molded to shape, dried to retain the shape, calcined, and then sintered.

It is known that grinding stainless steel material is more challenging than carbon steel. In fact, in coated abrasive articles, materials that are targeted for finishing stainless steel are generally provided with a top layer known as a supersize layer (or simply a "supersize"). Such a supersize layer is generally highly filled with halogen-containing particulates (e.g., $KBF_4$ and/or $Na_3AlF_6$ (cryolite)), also known as grinding aids, that enhance the abrading (e.g., grinding) performance of the abrasive. However, halogens are generally regarded as contaminants in stainless steel, and especially in the nuclear industry. The presence of halogens is also known to promote stress corrosion cracking in austenitic welds such as, for example, 304 stainless steel and nickel-based alloy welds.

SUMMARY

In one aspect, the present disclosure provides a ceramic shaped abrasive particle bounded by:
  a base surface having a perimeter;
  contiguous sidewalls abutting the perimeter, wherein each of the contiguous sidewalls abuts the perimeter, wherein collectively the contiguous sidewalls abut the perimeter in its entirety, and wherein adjacent pairs of the contiguous sidewalls abut each other along respective corner edges; and
  a multifaceted surface comprising contiguous facets, wherein the multifaceted surface is spaced apart from the base surface by the contiguous sidewalls, and wherein at least one V-shaped groove extends from a first one of the corner edges across the multifaceted surface to one of the contiguous sidewalls that does not contact the first one of the corner edges;
  and wherein, on a total area basis, less than ten percent of the multifaceted surface is parallel to the base surface.

Typically, more than one ceramic shaped abrasive particle is used for a specific application and/or abrasive article. Accordingly, in second aspect, the present disclosure provides a plurality of ceramic shaped abrasive particles according to the present disclosure. The ceramic shaped abrasive particles may be selected to have a size distribution corresponding to an abrasives industry specified nominal grade.

In a third aspect, the present disclosure provides a coated abrasive article comprising a plurality of ceramic shaped abrasive particles according to the present disclosure bonded to a backing.

Unexpectedly and advantageously, ceramic shaped abrasive particles according to the present disclosure exhibit sufficiently improved abrading properties that they can be used to make coated abrasive articles, without added halogen-containing grinding aids, that perform comparably to conventional coated abrasive articles containing grinding aid, or alternatively enhance the abrading performance of coated abrasive particles that do.

As used herein, the term "nominally" as used in reference to a property (e.g., planarity) means that minor variation in the property resulting from manufacturing tolerances are included. For example, nominally planar would include a surface having an unintended surface defect such as a random hole or random curvature arising out of the manufacturing process.

As used herein, the term "substantially planar" as used in reference to surfaces of the abrasive particles means that the surface has a generally planar character which may having periodic minor deviations from planarity.

Features and advantages of the present disclosure will be further understood upon consideration of the detailed description as well as the appended claims.

Figure 1:
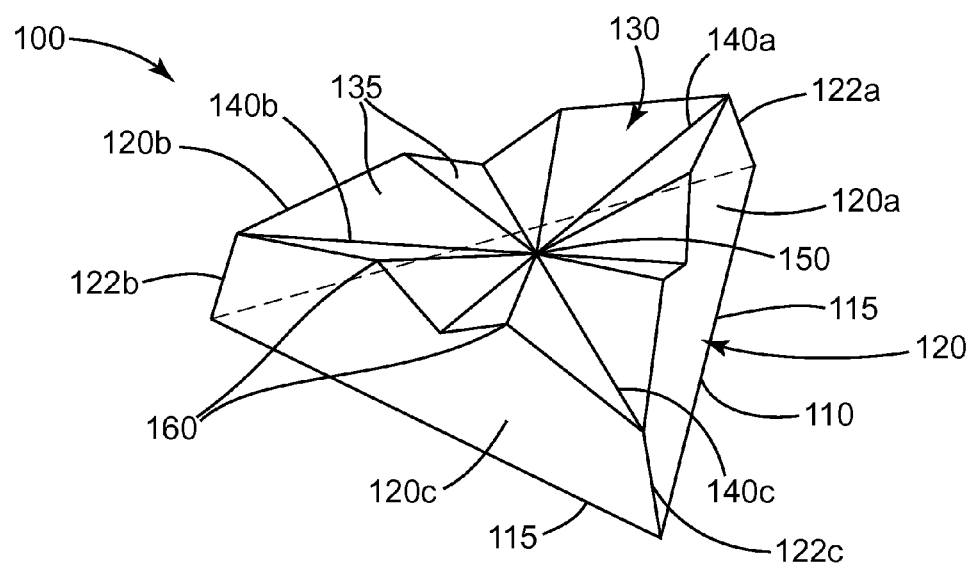
FIG. 1 is a schematic perspective view of an exemplary ceramic shaped abrasive particle 100 according to one embodiment of the present disclosure.

Repeated use of reference characters in the specification and drawings is intended to represent the same or analogous features or elements of the disclosure. It should be understood that numerous other modifications and embodiments can be devised by those skilled in the art, which fall within

DETAILED DESCRIPTION

Referring to FIG. 1, exemplary ceramic shaped abrasive particle 100 is illustrated. The material from which the ceramic shaped abrasive particle 100 comprises a ceramic material (e.g., alpha alumina).

Ceramic shaped abrasive particle 100 is bounded by base surface 110 having perimeter 115, contiguous sidewalls 120a, 120b, 120c, and multifaceted surface 130. Each one of contiguous sidewalls 120a, 120b, 120c abuts perimeter 115. Collectively, contiguous sidewalls 120a, 120b, 120c abut the entirety of perimeter 115. Adjacent pairs of the contiguous sidewalls 120a and 120b, 120b and 120c, and 120a and 120c abut each other along respective corner edges 122a, 122b, 122c.

Multifaceted surface 130 comprises contiguous facets 135. Multifaceted surface 130 is spaced apart from base surface 110 by contiguous sidewalls 120a, 120b, 120c. Three V-shaped grooves 140a, 140b, 140c extend from respective corner edges 122a, 122b, 122c through a common point 150 and across multifaceted surface 130 to respective sidewalls 120b, 120c, and 120a. Each one of cusps 160 is formed by two facets 135 and one sidewall 120.

As shown in FIG. 1, the base surface, each one of the contiguous sidewalls and facets are planar; however, this is not a requirement. In some preferred embodiments, the base surface, each one of the contiguous sidewalls, and the facets are at least substantially planar or at least nominally planar (e.g., planar). In other preferred embodiments, any or all of (or any subcombination thereof) of the base surface, the contiguous sidewalls, and the facets may be curved (e.g., concave, convex, or a combination thereof) or have additional topographical features.

Figure 2:
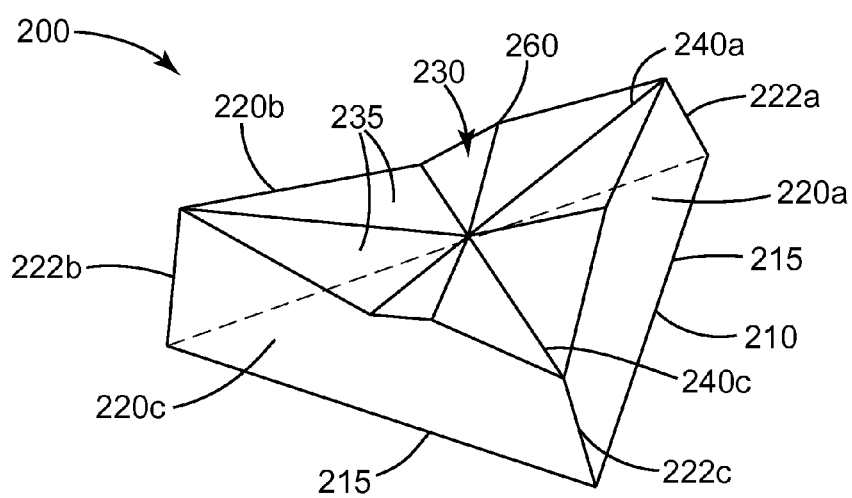
FIG. 2 is a schematic perspective view of an exemplary ceramic shaped abrasive particle 200 according to one embodiment of the present disclosure.

In a second embodiment, shown in FIG. 2, ceramic shaped abrasive particle 200 is bounded by base surface 210 having perimeter 215, contiguous sidewalls 220a, 220b, 220c, and multifaceted surface 230. Each one of contiguous sidewalls 220a, 220b, 220c abuts perimeter 215. Collectively, contiguous sidewalls 220a, 220b, 220c abut the entirety of perimeter 215. Adjacent pairs of the contiguous sidewalls 220a and 220b, 220b and 220c, and 220a and 220c abut each other along respective corner edges 222a, 222b, 222c.

Multifaceted surface 230 comprises contiguous facets 235. Multifaceted surface 230 is spaced apart from base surface 210 by contiguous sidewalls 220a, 220b, 220c. Two V-shaped grooves 240a, 240c extend from respective corner edges 222a, 222c across multifaceted surface 230 to respective sidewalls 220c, 220b. Cusps 260 are formed by two facets and one sidewall.

Figure 3:
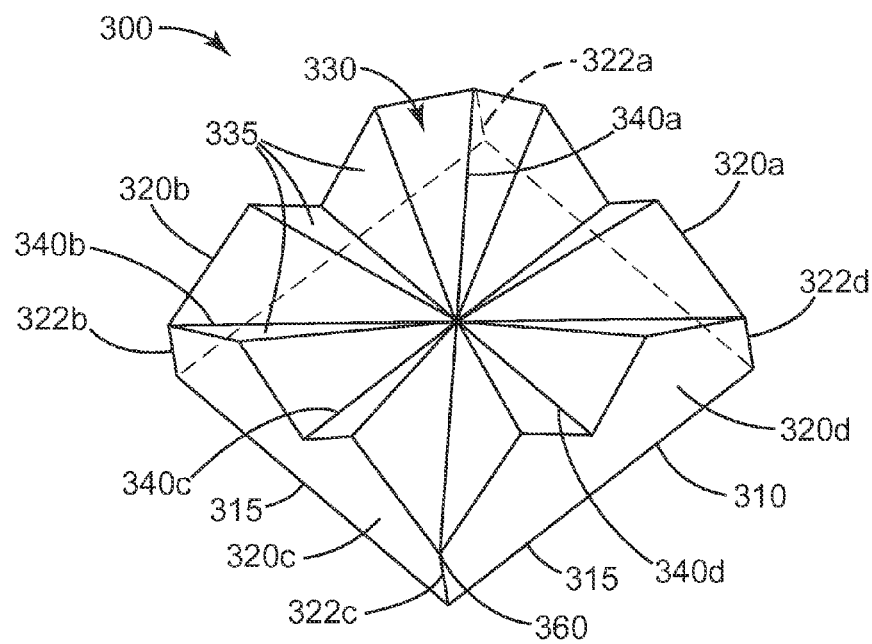
FIG. 3 is a schematic perspective view of an exemplary ceramic shaped abrasive particle 300 according to one embodiment of the present disclosure.

In a third embodiment, shown in FIG. 3, ceramic shaped abrasive particle 300 is bounded by base surface 310 having perimeter 315, contiguous sidewalls 320a, 320b, 320c, 320d and multifaceted surface 330. Each one of contiguous sidewalls 320a, 320b, 320c, 320d abuts perimeter 315. Collectively, contiguous sidewalls 320a, 320b, 320c, 320d abut the entirety of perimeter 315. Adjacent pairs of the contiguous sidewalls 320a and 320b, 320b and 320c, 320c and 320d, 320d and 320a abut each other along respective corner edges 322a, 322b, 322c, 322d.

Multifaceted surface 330 comprises contiguous facets 335. Multifaceted surface 330 is spaced apart from base surface 310 by contiguous sidewalls 320a, 320b, 320c, 320d. Two V-shaped grooves 340a, 340b extend respectively from corner edges 322a, 322b across multifaceted surface 330 to corner edges 322c, 322d. Two additional V-shaped grooves 340c, 340d extend across multifaceted surface 330 between nonadjacent pairs of sidewalls 320a and 320c, 320b and 320d. Each one of cusps 360 is formed by two facets and one sidewall.

Figure 4:
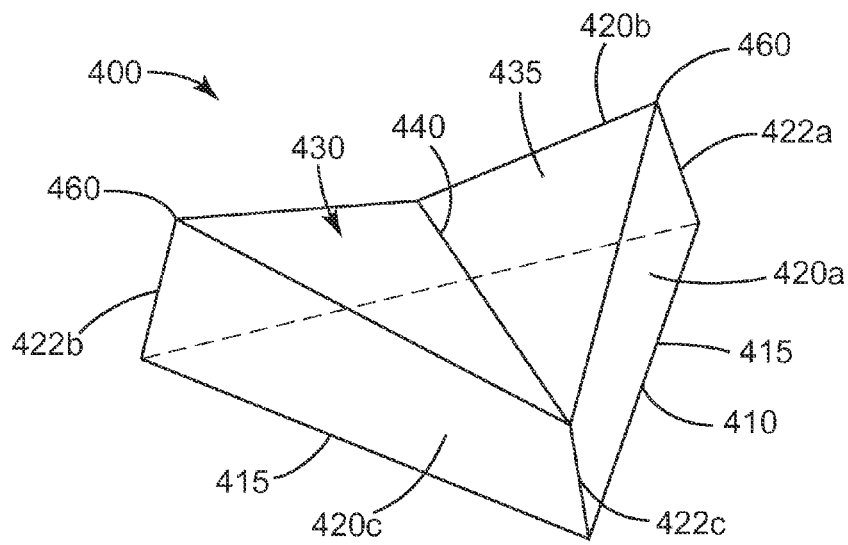
FIG. 4 is a schematic perspective view of an exemplary ceramic shaped abrasive particle 400 according to one embodiment of the present disclosure.

In a fourth embodiment, shown in FIG. 4, ceramic shaped abrasive particle 400 is bounded by base surface 410 having perimeter 415, contiguous sidewalls 420a, 420b, 420c and multifaceted surface 430. Each one of contiguous sidewalls 420a, 420b, 420c abuts perimeter 415. Collectively, contiguous sidewalls 420a, 420b, 420c abut the entirety of perimeter 415. Adjacent pairs of the contiguous sidewalls 420a and 420b, 420b and 420c, 420c and 420a abut each other along respective corner edges 422a, 422b, 422c.

Multifaceted surface 430 comprises contiguous facets 435. Multifaceted surface 430 is spaced apart from base surface 410 by contiguous sidewalls 420a, 420b, 420c. V-shaped groove 440 extends from respective corner edge 422c across multifaceted surface 430 to sidewall 420b. Cusps 460 are each formed by one facet and two sidewalls.

Figure 5:
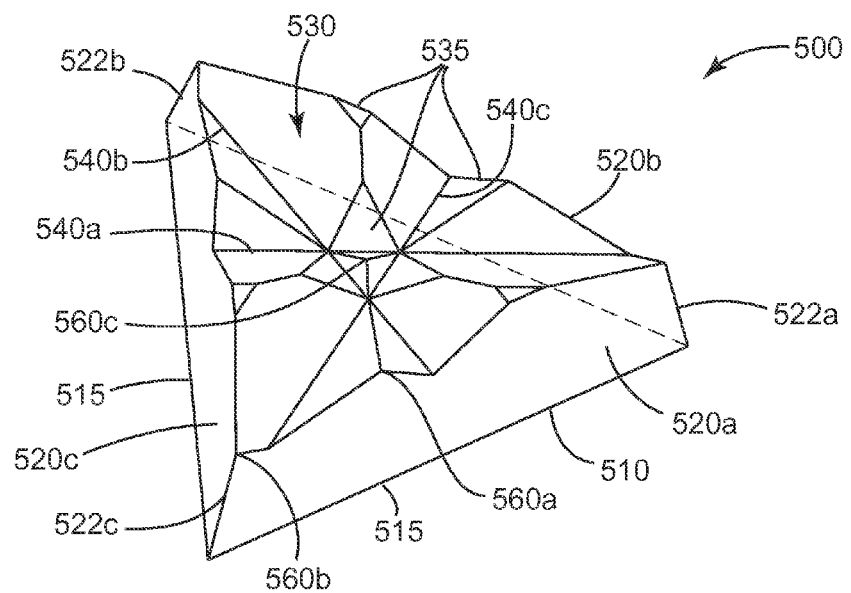
FIG. 5 is a schematic perspective view of an exemplary ceramic shaped abrasive particle 500 according to one embodiment of the present disclosure.
Figure 6:
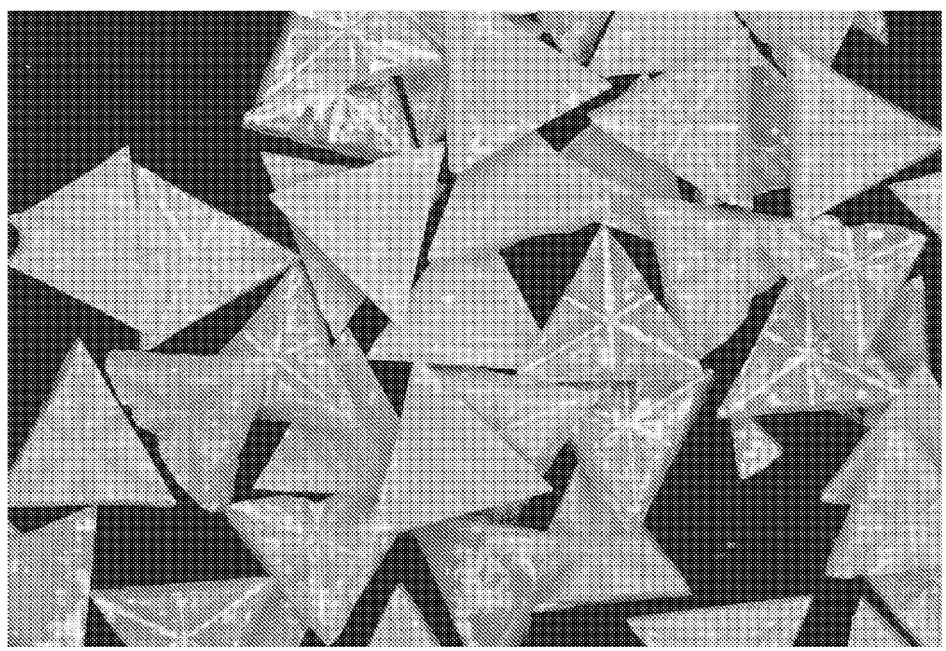
FIG. 6 is a micrograph of ceramic shaped abrasive particles CSAP2.

In a fifth embodiment, shown in FIG. 5, ceramic shaped abrasive particle 500 is bounded by base surface 510 having perimeter 515, contiguous sidewalls 520a, 520b, 520c, and multifaceted surface 530. Each one of contiguous sidewalls 520a, 520b, 520c abuts perimeter 515. Collectively, contiguous sidewalls 520a, 520b, 520c abut the entirety of perimeter 515. Adjacent pairs of the contiguous sidewalls 520a and 520b, 520b and 520c, and 520a and 520c abut each other along respective corner edges 522a, 522b, 522c.

Multifaceted surface 530 comprises contiguous facets 535. Multifaceted surface 530 is spaced apart from base surface 510 by contiguous sidewalls 520a, 520b, 520c. Two V-shaped grooves 540a, 540b extend from respective corner edges 522a, 522b across multifaceted surface 530 to respective sidewalls 520b, 520c. V-shaped groove 540c extends from sidewall 520b across multifaceted surface 530 to sidewall 520a. Cusp 560a is formed by two facets and one sidewall, while cusp 560b is formed by one facet and two sidewalls, and cusp 560c is formed by three facets and no sidewalls.

Ceramic shaped abrasive particles useful in practice of the present disclosure may comprise, consist essentially of, or consist of any ceramic material. Useful ceramic materials include, for example, crystalline ceramics and glass-ceramics. Preferably, the ceramic material is fused or sintered and polycrystalline; however, this is not a requirement. Useful ceramic materials include, for example, alpha alumina, fused alumina-zirconia, and fused oxynitrides. Further details concerning sol-gel derived ceramic materials suitable for use in shaped ceramic abrasive particles according to the present disclosure can be found in, for example, U.S. Pat. No. 4,314,827 (Leitheiser et al.); U.S. Pat. No. 4,518,397 (Leitheiser et al.); U.S. Pat. No. 4,623,364 (Cottringer et al.); U.S. Pat. No. 4,744,802 (Schwabel); U.S. Pat. No. 4,770,671 (Monroe et al.); U.S. Pat. No. 4,881,951 (Wood et al.); U.S. Pat. No. 4,960,441 (Pellow et al.); U.S. Pat. No. 5,139,978 (Wood); U.S. Pat. No. 5,201,916 (Berg et al.); U.S. Pat. No. 5,366,523 (Rowenhorst et al.); U.S. Pat. No. 5,429,647 (Larmie); U.S. Pat. No. 5,547,479 (Conwell et al.); U.S. Pat. No. 5,498,269 (Larmie); U.S. Pat. No. 5,551,963 (Larmie); U.S. Pat. No. 5,725,162 (Garg et al.), and U.S. Pat. No. 6,054,093 (Torre et al.).

Ceramic shaped abrasive particles composed of crystallites of alpha alumina, magnesium alumina spinel, and a rare earth hexagonal aluminate may be prepared using sol-gel alpha alumina precursor particles according to methods described in, for example, U.S. Pat. No. 5,213,591 (Celikkaya et al.) and U.S. Publ. Pat. Appl. Nos. 2009/0165394 A1 (Culler et al.) and 2009/0169816 A1 (Erickson et al.). The alpha alumina abrasive grain may contain zirconia as disclosed in U.S. Pat. No. 5,551,963 (Larmie). Alternatively, the alpha alumina abrasive grain can have a microstructure or additives as disclosed in U.S. Pat. No. 6,277,161 (Castro). More information concerning methods to make ceramic shaped abrasive particles is disclosed in co-pending U.S. Publ. Pat. Appln. No. 2009/0165394 A1 (Culler et al.).

The ceramic shaped abrasive particles used in the present disclosure can typically be made using tools (i.e., molds) cut using precision machining, which provides higher feature definition than other fabrication alternatives such as, for example, stamping or punching. Typically, the cavities in the tool surface have planar faces that meet along sharp edges, and form the sides of a regular tetrahedron. The resultant ceramic shaped abrasive particles have a respective nominal average shape that corresponds to the shape of cavities in the tool surface; however, variations (e.g., random variations) from the nominal average shape may occur during manufacture, and ceramic shaped abrasive particles exhibiting such variations are included within the definition of ceramic shaped abrasive particles as used herein.

Ceramic shaped abrasive particles made according to the present disclosure can be incorporated into an abrasive article, or used in loose form. Abrasive particles are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasives industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards. ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, the ceramic shaped abrasive particles can graded to a nominal screened grade using U.S.A. Standard Test Sieves conforming to ASTM E-11 "Standard Specification for Wire Cloth and Sieves for Testing Purposes." ASTM E-11 proscribes the requirements for the design and construction of testing sieves using a medium of woven wire cloth mounted in a frame for the classification of materials according to a designated particle size. A typical designation may be represented as −18+20 meaning that the abrasive particles pass through a test sieve meeting ASTM E-11 specifications for the number 18 sieve and are retained on a test sieve meeting ASTM E-11 specifications for the number 20 sieve. In one embodiment, the ceramic shaped abrasive particles have a particle size such that most of the particles pass through an 18 mesh test sieve and can be retained on a 20, 25, 30, 35, 40, 45, or 50 mesh test sieve. In various embodiments of the present disclosure, the ceramic shaped abrasive particles can have a nominal screened grade comprising: −12+14, −14+16, −16+14, −18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635.

In one aspect, the present disclosure provides a plurality of ceramic shaped abrasive particles having an abrasives industry specified nominal grade or nominal screened grade, wherein at least a portion of the plurality of abrasive particles are ceramic shaped abrasive particles according to the present disclosure. In another aspect, the disclosure provides a method comprising grading the ceramic shaped abrasive particles made according to the present disclosure to provide a plurality of ceramic shaped abrasive particles having an abrasives industry specified nominal grade or a nominal screened grade.

The contiguous sidewalls separate the base surface from the multifaceted surface. Together with the facets they form cusps at the peripheral edge of the multifaceted surface. For example, a cusp may be formed by two sidewalls and one facet, two facets and one sidewall, three facets and one sidewall, or two facets and two sidewalls. While in FIG. 1 each one of the cusps contacts a sidewall, in other embodiments the multifaceted surface may comprise one or more additional cusps that do not contact any of the sidewalls (e.g., see FIG. 5). Preferably, the sidewalls taper inwardly toward the center of the multifaceted surface as they extend away from the base surface, although this is not a requirement. The taper angle (corresponding to a draft angle of a mold used to make the abrasive particle) preferably has a value of from 5 to 11 degrees, and more preferably 7 to 9 degrees, relative to a line taken normal to the base surface.

The number of contiguous sidewalls will depend on the shape of the perimeter the base surface. Any number of contiguous sidewalls greater than or equal to three may be present. Preferably, the number of contiguous sidewalls is 3, 4, or 6, corresponding to trigonal, rectangular or square, and hexagonal base surfaces, respectively.

The multifaceted surface comprises contiguous facets, although it may contain other elements as well. In preferred embodiments, the multifaceted surface is at least nominally composed (e.g., composed of) entirely of facets (e.g., as shown in FIG. 1); however, this is not a requirement. In some embodiments, none of the facets are be parallel to the base surface; however, in other embodiments some of the facets may be parallel to the base surface. In such embodiments, the cumulative fraction of the multifaceted surface taken up by such facets may be less than 10 percent, less than 8 percent, less than 6 percent, less than 4 percent, less than 2 percent, or even less than 1 percent of the area of the multifaceted surface.

Cusps disposed at the multifaceted surface may have at least nominally equal (e.g., equal) or unequal heights relative to the base surface.

In preferred embodiments, ceramic shaped abrasive particles can be made according to a multistep process. The process can be carried out using any ceramic precursor dispersion material.

Briefly, the method comprises the steps of making either a seeded or non-seeded ceramic precursor dispersion that can be converted into a corresponding ceramic (e.g., a boehmite sol-gel that can be converted to alpha alumina); filling one or more mold cavities having the desired outer shape of the shaped abrasive particle with a ceramic precursor dispersion, drying the ceramic precursor dispersion to form precursor ceramic shaped abrasive particles; removing the precursor ceramic shaped abrasive particles from the mold cavities; calcining the precursor ceramic shaped abrasive particles to form calcined, precursor ceramic shaped abrasive particles, and then sintering the calcined, precursor ceramic shaped abrasive particles to form ceramic shaped abrasive particles. The process will now be described in greater detail in the context of alpha-alumina-containing ceramic shaped abrasive particles.

The first process step involves providing either a seeded or non-seeded dispersion of a ceramic precursor that can be converted into ceramic. The ceramic precursor dispersion often comprises a liquid that is a volatile component. In one embodiment, the volatile component is water. The dispersion should comprise a sufficient amount of liquid for the viscosity of the dispersion to be sufficiently low to enable filling mold cavities and replicating the mold surfaces, but not so much liquid as to cause subsequent removal of the liquid from the mold cavity to be prohibitively expensive. In one embodiment, the ceramic precursor dispersion comprises from 2 percent to 90 percent by weight of the particles that can be converted into ceramic, such as particles of aluminum oxide monohydrate (boehmite), and at least 10 percent by weight, or from 50 percent to 70 percent, or 50 percent to 60 percent, by weight of the volatile component such as water. Conversely, the ceramic precursor dispersion in some embodiments contains from 30 percent to 50 percent, or 40 percent to 50 percent, by weight solids.

Examples of useful ceramic precursor dispersions include zirconium oxide sols, vanadium oxide sols, cerium oxide sols, aluminum oxide sols, and combinations thereof. Useful aluminum oxide dispersions include, for example, boehmite dispersions and other aluminum oxide hydrates dispersions. Boehmite can be prepared by known techniques or can be obtained commercially. Examples of commercially available boehmite include products available as DISPERAL and DISPAL from Sasol North America, Inc. or as HIQ-40 from BASF Corporation. These aluminum oxide monohydrates are relatively pure; that is, they include relatively little, if any, hydrate phases other than monohydrates, and have a high surface area.

The physical properties of the resulting ceramic shaped abrasive particles will generally depend upon the type of material used in the ceramic precursor dispersion. As used herein, a "gel" is a three dimensional network of solids dispersed in a liquid.

The ceramic precursor dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the ceramic precursor dispersion can be varied based on skill in the art.

Typically, the introduction of a modifying additive or precursor of a modifying additive will cause the ceramic precursor dispersion to gel. The ceramic precursor dispersion can also be induced to gel by application of heat over a period of time to reduce the liquid content in the dispersion through evaporation.

The ceramic precursor dispersion can also contain a nucleating agent. Nucleating agents suitable for this disclosure can include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating alpha alumina precursor dispersions is disclosed in U.S. Pat. No. 4,744,802 (Schwabel).

A peptizing agent can be added to the ceramic precursor dispersion to produce a more stable hydrosol or colloidal ceramic precursor dispersion. Suitable peptizing agents are monoprotic acids or acid compounds such as acetic acid, hydrochloric acid, formic acid, and nitric acid. Multiprotic acids can also be used but they can rapidly gel the ceramic precursor dispersion, making it difficult to handle or to introduce additional components thereto. Some commercial sources of boehmite contain an acid titer (such as absorbed formic or nitric acid) that will assist in forming a stable ceramic precursor dispersion.

The ceramic precursor dispersion can be formed by any suitable means; for example, in the case of a sol-gel alumina precursor by simply mixing aluminum oxide monohydrate with water containing a peptizing agent or by forming an aluminum oxide monohydrate slurry to which the peptizing agent is added. Defoamers or other suitable chemicals can be added to reduce the tendency to form bubbles or entrain air while mixing. Additional chemicals such as wetting agents, alcohols, or coupling agents can be added if desired.

The second process step involves providing a mold having at least one mold cavity, and preferably a plurality of cavities formed in at least one major surface of the mold. In some embodiments, the mold is formed as a production tool, which can be, for example, a belt, a sheet, a continuous web, a coating roll such as a rotogravure roll, a sleeve mounted on a coating roll, or a die. In one embodiment, the production tool comprises polymeric material. Examples of suitable polymeric materials include thermoplastics such as polyesters, polycarbonates, poly(ether sulfone), poly(methyl methacrylate), polyurethanes, polyvinyl chloride, polyolefin, polystyrene, polypropylene, polyethylene or combinations thereof, or thermosetting materials. In one embodiment, the entire tooling is made from a polymeric or thermoplastic material. In another embodiment, the surfaces of the tooling in contact with the ceramic precursor dispersion while drying, such as the surfaces of the plurality of cavities, comprises polymeric or thermoplastic materials and other portions of the tooling can be made from other materials. A suitable polymeric coating may be applied to a metal tooling to change its surface tension properties by way of example.

A polymeric or thermoplastic production tool can be replicated off a metal master tool. The master tool will have the inverse pattern desired for the production tool. The master tool can be made in the same manner as the production tool. In one embodiment, the master tool is made out of metal, e.g., nickel and is diamond turned. In one embodiment, the master tool is at least partially formed using stereolithography. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to cavities can be from an opening in the top surface or bottom surface of the mold. In some instances, the cavities can extend for the entire thickness of the mold. Alternatively, the cavities can extend only for a portion of the thickness of the mold. In one embodiment, the top surface is substantially parallel to bottom surface of the mold with the cavities having a substantially uniform depth. At least one side of the mold, that is, the side in which the cavities are formed, can remain exposed to the surrounding atmosphere during the step in which the volatile component is removed.

The cavities have a specified three-dimensional shape to make the ceramic shaped abrasive particles. The depth dimension is equal to the perpendicular distance from the top surface to the lowermost point on the bottom surface. The cavities of a given mold can be of the same shape or of different shapes.

In one embodiment, the shape of a cavity can be described as being a triangle, as viewed from the top, having a sloping sidewall such that the bottom surface (i.e., corresponding to the multifaceted surface of the ceramic shaped abrasive particle) of the cavity is slightly smaller than the opening in the top surface. A sloping sidewall is believed to enable easier removal of the shaped precursor abrasive particles from the mold and to enhance the grinding performance of the abrasive particles.

Mold cavity shapes can be used, such as, circles, rectangles, squares, hexagons, stars, or combinations thereof, all having a substantially uniform depth dimension. The depth dimension is equal to the perpendicular distance from the top surface to the lowermost point on the bottom surface. In addition, a cavity can have the inverse of other geometric shapes, such as, for example, pyramidal, frustopyramidal, truncated spherical, truncated spheroidal, conical, and frustoconical. The depth of a given cavity can be uniform or can vary along its length and/or width. The cavities of a given mold can be of the same shape or of different shapes.

The third process step involves filling the cavities in the mold with the ceramic precursor dispersion (e.g., by a conventional technique). In some embodiments, a knife roll coater or vacuum slot die coater can be used. A mold release can be used to aid in removing the particles from the mold if desired. Typical mold release agents include oils such as peanut oil or mineral oil, fish oil, silicones, polytetrafluoroethylene, zinc stearate, and graphite. In general, mold release agent such as peanut oil, in a liquid, such as water or alcohol, is applied to the surfaces of the production tooling in contact with the ceramic precursor dispersion such that between about 0.1 mg/in$^2$ (0.6 mg/cm$^2$) to about 3.0 mg/in$^2$ (20 mg/cm$^2$), or between about 0.1 mg/in$^2$ (0.6 mg/cm$^2$) to about 5.0 mg/in$^2$ (30 mg/cm$^2$) of the mold release agent is present per unit area of the mold when a mold release is desired. In some embodiments, the top surface of the mold is coated with the ceramic precursor dispersion. The ceramic precursor dispersion can be pumped onto the top surface.

Next, a scraper or leveler bar can be used to force the ceramic precursor dispersion fully into the cavity of the mold. The remaining portion of the ceramic precursor dispersion that does not enter cavity can be removed from top surface of the mold and recycled. In some embodiments, a small portion of the ceramic precursor dispersion can remain on the top surface and in other embodiments the top surface is substantially free of the dispersion. The pressure applied by the scraper or leveler bar is typically less than 100 psi (0.6 MPa), less than 50 psi (0.3 MPa), or even less than 10 psi (60 kPa). In some embodiments, no exposed surface of the ceramic precursor dispersion extends substantially beyond the top surface.

To facilitate the exposed surfaces of the cavities resulting in planar base surfaces of the shaped ceramic abrasive particles, it may be desirable to overfill the cavities (e.g., using a micronozzle array) and slowly dry the ceramic precursor dispersion.

The fourth process step involves removing the volatile component to dry the dispersion. Desirably, the volatile component is removed by fast evaporation rates. In some embodiments, removal of the volatile component by evaporation occurs at temperatures above the boiling point of the volatile component. An upper limit to the drying temperature often depends on the material the mold is made from. For polypropylene tooling the temperature should be less than the melting point of the plastic.

In one embodiment, for a water dispersion of between about 40 to 50 percent solids and a polypropylene mold, the drying temperatures can be between about 90° C. to about 165° C., or between about 105° C. to about 150° C., or between about 105° C. to about 120° C. Higher temperatures can lead to improved production speeds but can also lead to degradation of the polypropylene tooling limiting its useful life as a mold.

During drying, the ceramic precursor dispersion shrinks, often causing retraction from the cavity walls. For example, if the cavities have planar walls, then the resulting ceramic shaped abrasive particles may tend to have at least three concave major sides. By making the cavity walls concave (whereby the cavity volume is increased) it is possible to obtain ceramic shaped abrasive particles that have substantially planar major sidewalls. The degree of concavity required generally depends on the solids content of the ceramic precursor dispersion.

The fifth process step involves removing resultant precursor ceramic shaped abrasive particles from the mold cavities. The precursor ceramic shaped abrasive particles can be removed from the cavities by using the following processes alone or in combination on the mold: gravity, vibration, ultrasonic vibration, vacuum, or pressurized air to remove the particles from the mold cavities.

The precursor ceramic shaped abrasive particles can be further dried outside of the mold. If the ceramic precursor dispersion is dried to the desired level in the mold, this additional drying step is not necessary. However, in some instances it may be economical to employ this additional drying step to minimize the time that the ceramic precursor dispersion resides in the mold. Typically, the precursor ceramic shaped abrasive particles will be dried from 10 to 480 minutes, or from 120 to 400 minutes, at a temperature from 50° C. to 160° C., or at 120° C. to 150° C.

The sixth process step involves calcining the precursor ceramic shaped abrasive particles. During calcining, essentially all the volatile material is removed, and the various components that were present in the ceramic precursor dispersion are transformed into metal oxides. The precursor ceramic shaped abrasive particles are generally heated to a temperature from 400° C. to 800° C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, precursor ceramic shaped abrasive particles. Then the precursor ceramic shaped abrasive particles are pre-fired again. This option is further described in U.S. Pat. No. 5,164,348 (Wood).

The seventh process step involves sintering the calcined, precursor ceramic shaped abrasive particles to form ceramic particles. Prior to sintering, the calcined, precursor ceramic shaped abrasive particles are not completely densified and thus lack the desired hardness to be used as ceramic shaped abrasive particles. Sintering takes place by heating the calcined, precursor ceramic shaped abrasive particles to a temperature of from 1000° C. to 1650° C. The length of time to which the calcined, precursor ceramic shaped abrasive particles must be exposed to the sintering temperature to achieve this level of conversion depends upon various factors but usually from five seconds to 48 hours is typical. In another embodiment, the duration for the sintering step ranges from one minute to 90 minutes.

After sintering, the ceramic shaped abrasive particles can have a Vickers hardness of 10 GPa (gigapascal), 16 GPa, 18 GPa, 20 GPa, or greater.

Other steps can be used to modify the described process such as, for example, rapidly heating the material from the calcining temperature to the sintering temperature and/or centrifuging the ceramic precursor dispersion to remove sludge and/or waste. Moreover, the process can be modified by combining two or more of the process steps if desired. Conventional process steps that can be used to modify the process of this disclosure are more fully described in U.S. Pat. No. 4,314,827 (Leitheiser).

If desired, the ceramic shaped abrasive particles having an abrasives industry specified nominal grade or a nominal screened grade can be mixed with other known abrasive or non-abrasive particles. In some embodiments, at least 5, 10, 15, 20, 25, 30, 35, 40, 45, 50, 55, 60, 65, 70, 75, 80, 85, 90, 95, or even 100 percent by weight of the plurality of abrasive particles having an abrasives industry specified nominal grade or a nominal screened grade are ceramic shaped abrasive particles made according to the present disclosure, based on the total weight of the plurality of abrasive particles.

Particles suitable for mixing with the ceramic shaped abrasive particles include conventional abrasive grains, diluent grains, or erodible agglomerates, such as those described in U.S. Pat. Nos. 4,799,939 and 5,078,753. Representative examples of conventional abrasive grains include fused aluminum oxide, silicon carbide, garnet, fused alumina zirconia, cubic boron nitride, diamond, and the like. Representative examples of diluent grains include marble, gypsum, and glass. Blends of differently ceramic shaped abrasive particles (e.g., triangles and squares) may be used.

The ceramic shaped abrasive particles may also have a surface coating. Surface coatings are known to improve the adhesion between abrasive grains and the binder in abrasive articles or can be used to aid in electrostatic deposition of the ceramic shaped abrasive particles. Such surface coatings are described in U.S. Pat. No. 5,213,591 (Celikkaya et al.); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz et al.). Additionally, the surface coating may prevent the shaped abrasive particles from capping. Capping is the term to describe the phenomenon where metal particles from the workpiece being abraded become welded to the tops of the shaped abrasive particles. Surface coatings to perform the above functions are known to those of skill in the art.

Figure 7:
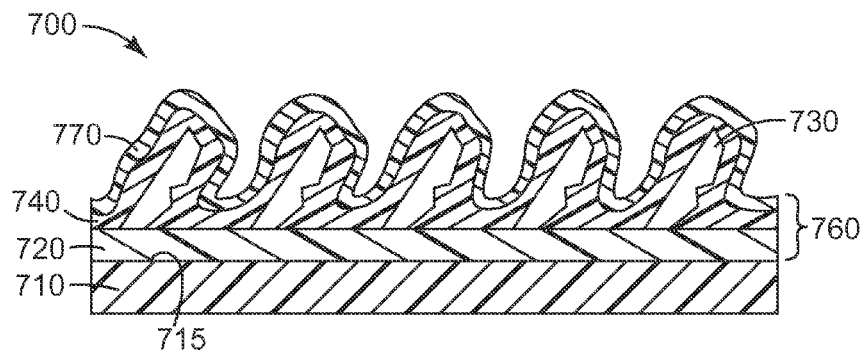
FIG. 7 is a schematic side view of an exemplary coated abrasive article 700 according to one embodiment of the present disclosure.

Referring now to FIG. 7, a coated abrasive article 700 comprises backing 710 having a first layer of binder material, hereinafter referred to as make layer 720, applied over on major surface 715 of backing 710. Attached or partially embedded in make layer 720 are a plurality of ceramic shaped abrasive particles 730. Over the ceramic shaped abrasive particles is a second layer of binder material, hereinafter referred to as size layer 740. The purpose of make layer 720 and size layer 740 is to secure ceramic shaped abrasive particles 730 to backing 710. Collectively, make layer 720, size layer 740 and ceramic shaped abrasive particles 730 form abrasive layer 760. Optional supersize layer 770 is disposed on abrasive layer 760.

The ceramic shaped abrasive particles can be oriented such that the tip or vertex points away from the backing as shown or towards the backing.

Exemplary useful backings include, for example, fabrics such as nonwoven (e.g., including needletacked, meltspun, spunbonded, hydroentangled, or meltblown nonwoven fabrics), knitted, stitchbonded, and woven fabrics (e.g., cloth); paper; mesh; polymeric film (including primed films) such as polyolefin film (e.g., polypropylene including biaxially oriented polypropylene, polyester film, polyamide film, cellulose ester film); foil; foam (e.g., natural sponge material or polyurethane foam); combinations of two or more of these materials; and treated versions thereof. The backing may also be a laminate of two materials (e.g., paper/film, cloth/paper, film/cloth).

The make layer and size layer comprise binder material (e.g., a resinous adhesive). The binder material of the make layer can be the same as or different from that of the size layer. Examples of binder materials that are suitable for these layers include phenolic resins, epoxy resins, urea-formaldehyde resins, acrylate resins, aminoplast resins, melamine resins, acrylated epoxy resins, urethane resins and combinations thereof. Phenolic resins are preferred in some embodiments, and may be used in both the powder form and liquid state. The organic binder material may also be modified with other binder materials to improve or alter its properties. The make layer, size layer, or both layers, may further comprise additives that are known in the art, such as, for example, fillers, grinding aids, wetting agents, surfactants, dyes, pigments, coupling agents, plasticizers, adhesion promoters, and combinations thereof. Examples of fillers include calcium carbonate, silica, talc, clay, calcium metasilicate, dolomite, aluminum sulfate and combinations thereof.

A grinding aid is defined as particulate material, the addition of which has a significant effect on the chemical and physical processes of abrading, thereby resulting in improved performance. As mentioned, it is believed that the ceramic shaped abrasive particles can have increased performance as a result of the opening 22 acting as a grinding aid reservoir. It is believed that the shaped abrasive particles 20 can have the opening 22 filled with a grinding aid prior to electrostatic deposition of the ceramic shaped abrasive particles thereby performing this function.

Grinding aids encompass a wide variety of different materials and can be inorganic or organic. Examples of chemical groups of grinding aids include waxes, organic halide compounds, halide salts, and metals and their alloys. The organic halide compounds will typically break down during abrading and release a halogen acid or a gaseous halide compound. Examples of such materials include chlorinated waxes, such as tetrachloronaphthalene, pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metals include tin, lead, bismuth, cobalt, antimony, cadmium, iron, and titanium. Other grinding aids include sulfur, organic sulfur compounds, graphite, and metallic sulfides. It is also within the scope of this present disclosure to use a combination of different grinding aids; in some instances, this may produce a synergistic effect. In one embodiment, the grinding aid was cryolite or potassium tetrafluoroborate. The amount of such additives can be adjusted to give desired properties. It is also within the scope of this present disclosure to utilize a supersize coating. The supersize layer typically contains a binder and a grinding aid. The binders can be formed from such materials as phenolic resins, acrylate resins, epoxy resins, urea-formaldehyde resins, melamine resins, urethane resins, and combinations thereof.

Coated (and other) abrasive articles according to the present disclosure may further comprise crushed abrasive particles (i.e., abrasive particles not resulting from breakage of the ceramic shaped abrasive particles and corresponding to an abrasive industry specified nominal graded or combination thereof). The crushed abrasive particles are typically of a finer size grade or grades (e.g., if a plurality of size grades are used) than the ceramic shaped abrasive particles, although this is not a requirement.

Useful crushed abrasive particles include, for example, crushed particles of fused aluminum oxide, brown fused aluminum oxide, heat treated aluminum oxide, white fused aluminum oxide, ceramic aluminum oxide materials such as those commercially available under the trade designation "3M CERAMIC ABRASIVE GRAIN" from 3M Company of St. Paul, Minn.), black silicon carbide, green silicon carbide, titanium diboride, boron carbide, tungsten carbide, titanium carbide, diamond, cubic boron nitride, garnet, fused alumina zirconia, aluminum oxynitride, sol-gel derived abrasive particles, iron oxide, chromia, ceria, zirconia, titania, silicates, tin oxide, silica (such as quartz, glass beads, glass bubbles and glass fibers) silicates (such as talc, clays (e.g., montmorillonite), feldspar, mica, calcium silicate, calcium metasilicate, sodium aluminosilicate, sodium silicate), flint, and emery. Examples of sol-gel derived abrasive particles can be found in U.S. Pat. No. 4,314,827 (Leitheiser et al.); U.S. Pat. No. 4,623,364 (Cottringer et al.); U.S. Pat. No. 4,744,802 (Schwabel); U.S. Pat. No. 4,770,671 (Monroe et al.); and U.S. Pat. No. 4,881,951 (Monroe et al.). It is also contemplated that the abrasive particles could comprise abrasive agglomerates such, for example, as those described in U.S. Pat. No. 4,652,275 (Bloecher et al.) and U.S. Pat. No. 4,799,939 (Bloecher et al.).

The abrasive particles may optionally be treated with one or more coupling agents to enhance adhesion of the abrasive particles to the binder. The abrasive particles may be treated with the coupling agent(s) before combining them with the binder material, or they may be surface treated in situ by including a coupling agent to the binder material. Coupling agents are well-known to those of skill in the abrasive arts. Examples of coupling agents include organosilane coupling agents (e.g., gamma-aminopropyltriethoxysilane), titanates, and zirconates.

Details concerning manufacture of coated abrasive articles having make and size layers are well known in the coated abrasive art may be found, for example, in U.S. Pat. No. 4,734,104 (Broberg); U.S. Pat. No. 4,737,163 (Larkey); U.S. Pat. No. 5,203,884 (Buchanan et al); U.S. Pat. No. 5,152,917 (Pieper et al.); U.S. Pat. No. 5,378,251 (Culler et al.); U.S. Pat. No. 5,417,726 (Stout et al.); U.S. Pat. No. 5,436,063 (Follett et al.); U.S. Pat. No. 5,496,386 (Broberg et al.); U.S. Pat. No. 5,609,706 (Benedict et al.); U.S. Pat. No. 5,520,711 (Helmin); U.S. Pat. No. 5,954,844 (Law et al.); U.S. Pat. No. 5,961,674 (Gagliardi et al.); U.S. Pat. No. 4,751,138 (Bange et al.); U.S. Pat. No. 5,766,277 (DeVoe et al.); U.S. Pat. No. 6,077,601 (DeVoe et al.); U.S. Pat. No. 6,228,133 (Thurber et al.); and U.S. Pat. No. 5,975,988 (Christianson).

It is also within the scope of this present disclosure that the ceramic shaped abrasive particles can be utilized in a bonded abrasive article, a nonwoven abrasive article, or abrasive brushes. A bonded abrasive can comprises a plurality of the ceramic shaped abrasive particles bonded together by means of a binder to form a shaped mass. The binder for a bonded abrasive can be metallic, organic, or vitreous. A nonwoven abrasive comprises a plurality of ceramic shaped abrasive particles bonded into a fibrous nonwoven web by means of an organic binder.

Select Embodiments of the Present Disclosure

In a first embodiment, the present disclosure provides a ceramic shaped abrasive particle bounded by:
 a base surface having a perimeter;
 contiguous sidewalls abutting the perimeter, wherein each of the contiguous sidewalls abuts the perimeter, wherein collectively the contiguous sidewalls abut the perimeter in its entirety, and wherein adjacent pairs of the contiguous sidewalls abut each other along respective corner edges; and
 a multifaceted surface comprising contiguous facets, wherein the multifaceted surface is spaced apart from the base surface by the contiguous sidewalls, and wherein at least one V-shaped groove extends from a first one of the corner edges across the multifaceted surface to one of the contiguous sidewalls that does not contact the first one of the corner edges;
 and wherein, on a total area basis, less than ten percent of the multifaceted surface is parallel to the base surface.

In a second embodiment, the present disclosure provides a ceramic shaped abrasive particle according to the first embodiment, wherein the base surface is substantially planar.

In a third embodiment, the present disclosure provides a ceramic shaped abrasive particle according to the first or second embodiment, wherein the base surface is trigonal.

In a fourth embodiment, the present disclosure provides a ceramic shaped abrasive particle according to any one of the first to third embodiments, wherein said at least one V-shaped groove comprises at least three V-shaped grooves that intersect at a common point.

In a fifth embodiment, the present disclosure provides a ceramic shaped abrasive particle according to any one of the first to fourth embodiments, wherein on a total area basis less than one percent of the multifaceted surface is parallel to the base surface.

In a sixth embodiment, the present disclosure provides a ceramic shaped abrasive particle according to any one of the first to fifth embodiments, wherein none of the multifaceted surface is parallel to the base surface.

In a seventh embodiment, the present disclosure provides a ceramic shaped abrasive particle according to any one of the first to sixth embodiments, wherein the multifaceted surface comprises at least four times as many of the contiguous facets as there are of the contiguous sidewalls.

In an eighth embodiment, the present disclosure provides a ceramic shaped abrasive particle according to any one of the first to seventh embodiments, wherein the multifaceted surface and the contiguous sidewalls collectively define at least six cusps.

In a ninth embodiment, the present disclosure provides a ceramic shaped abrasive particle according to any one of the first to eighth embodiments, wherein the multifaceted surface comprises a centrally disposed pyramid that does not contact the contiguous sidewalls.

In a tenth embodiment, the present disclosure provides a ceramic shaped abrasive particle according to any one of the first to ninth embodiments, wherein the multifaceted surface is composed of the contiguous facets.

In an eleventh embodiment, the present disclosure provides a ceramic shaped abrasive particle according to any one of the first to tenth embodiments, wherein at least the multifaceted surface is formed by a molding process.

In a twelfth embodiment, the present disclosure provides a ceramic shaped abrasive particle according to any one of the first to eleventh embodiments, wherein the contiguous sidewalls taper inwardly as they extend away from the base surface.

In a thirteenth embodiment, the present disclosure provides a ceramic shaped abrasive particle according to any one of the first to twelfth embodiments, wherein the ceramic shaped abrasive particle comprises alpha alumina.

In a fourteenth embodiment, the present disclosure provides a plurality of ceramic shaped abrasive particles according to any one of the first to thirteenth embodiments.

In a fifteenth embodiment, the present disclosure provides a plurality of ceramic shaped abrasive particles according to the fourteenth embodiment, having a size distribution corresponding to at least one of an abrasives industry specified nominal grade or a nominal screened grade.

In a sixteenth embodiment, the present disclosure provides a coated abrasive article comprising a plurality of ceramic shaped abrasive particles according to the fourteenth or fifteenth embodiment bonded to a backing.

In a seventeenth embodiment, the present disclosure provides a coated abrasive article according to the sixteenth embodiment, further comprising:
a make layer at least partially disposed on the backing; and
a size layer at least partially disposed on the make layer.

In an eighteenth embodiment, the present disclosure provides a coated abrasive article according to the sixteenth or seventeenth embodiment, wherein the coated abrasive article further comprises a supersize layer at least partially disposed on the size layer, and wherein the supersize layer comprises a grinding aid.

In a nineteenth embodiment, the present disclosure provides a coated abrasive article according to the sixteenth or seventeenth embodiment, wherein the coated abrasive article is free of a supersize layer comprising a grinding aid.

In a twentieth embodiment, the present disclosure provides a coated abrasive article according to the sixteenth or seventeenth embodiment, wherein the coated abrasive article is free of grinding aid.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. A summary of various raw materials used to prepare the examples is provided in Table 1 (below).

TABLE 1

| RAW MATERIALS | SOURCE |
| --- | --- |
| $Mg(NO_3)_2$ solution | equivalent to 10.5 percent by weight as oxide in solution, from Hawkins, Inc., St. Paul, Minnesota |
| $Y(NO_3)_3$ solution | equivalent to 24.1 percent by weight as oxide in solution, from Sigma-Aldrich, Saint Louis, Missouri |
| $La(NO_3)_3$ solution | equivalent to 20.0 percent by weight as oxide in solution, from Sigma-Aldrich |
| Resole Phenolic Resin | metal hydroxide catalyzed phenol-formaldehyde resin, ca. 75 percent in water |
| Epoxy Resin | EPON 828 epoxy resin (bisphenol A diglycidyl ether) obtained from Momentive Specialty Chemicals, Columbus, Ohio |
| Filler | calcium carbonate having a particle size less than 46 micrometers and an average particle size of about 15 micrometers, obtained as GEORGIA MARBLE NO. 10 from Georgia Marble, Gantts Quarry, Alabama |
| Grinding Aid 1 | cryolite, obtained as RTN Cryolite from TR International Trading Co., Houston, Texas |
| Grinding Aid 2 | Potassium tetrafluoroborate obtained from Solvay Fluorides LLC, Houston, Texas |
| Surfactant 1 | 0.5 percent ethoxylated oleic acid surfactant, obtained as EMULON A from BASF Corp., Mount Olive, New Jersey |
| Curing Agent | IMICURE EMI 24 curing agent obtained from Air Products and Chemicals, Allentown, Pennsylvania |
| Anti-foam | ANTIFOAM 1430 antifoaming agent obtained from Dow Corning Corporation, Midland, Michigan |

Preparation of Ceramic Shaped Abrasive Particles
Preparation of CSAP1

The shaped abrasive particles of CSAP1 were made by preparing a boehmite sol-gel using the following recipe: DISPERAL aluminum oxide monohydrate powder (1600 parts by weight, from Sasol North America, Houston, Tex.) was dispersed by high shear mixing a solution containing water (2400 parts by weight) and 70% aqueous nitric acid (72 parts by weight $HNO_3$) for 11 minutes. The resulting sol-gel was aged for at least 1 hour before coating. The sol-gel was forced into production tooling having equilateral triangular shaped mold cavities of 28 mils (0.71 mm) depth and 110 mils (2.78 mm) on each side. The angle between the sidewalls and bottom of the mold was 98 degrees. A mold release agent, 1 percent peanut oil in methanol, was used to coat the production tooling with about 0.5 mg/in² (0.08 mg/cm²) of peanut oil applied to the production tooling. The excess methanol was removed by placing sheets of the production tooling in an air convection oven for 5 minutes at 45° C. The sol-gel was forced into the cavities with a putty knife so that the openings of the production tooling were completely filled. The sol-gel coated production tooling was placed in an air convection oven at 45° C. for at least 45 minutes to dry. The precursor shaped abrasive particles were removed from the production tooling by passing it over an ultrasonic horn. The precursor shaped abrasive particles were calcined at approximately 650° C. and then saturated with a mixed nitrate solution of 1.2 percent MgO, 1.2 percent $Y_2O_3$, and 2.4 percent $La_2O_3$ (reported as oxides). The saturated precursor shaped abrasive particles were allowed to dry after which the particles were again calcined at 650° C. and sintered at approximately 1400° C. Both the calcining and sintering steps were performed using rotary tube kilns. The resulting ceramic shaped abrasive particles exited the kiln into room temperature air, where it was collected in a metal container and allowed to cool to room temperature.

Preparation of CSAP2

CSAP2 was prepared identically to CSAP1, except that the production tool cavities were resulting in ceramic shaped abrasive particles with triangular prism features as shown in FIG. 1, wherein V-groove of the ceramic shaped abrasive particles, which had a three-fold rotational axis of symmetry, had a nominal depth of 0.249 mm, and each side lengths had a nominal length of 2.189 mm, and the nominal particle thickness was 0.794 mm.

Abrasive Disc Preparation

Comparative Example A

Abrasive discs of Comparative Example A were prepared by coating 7-inch discs ((17.8 cm) diameter and ⅞-inch (2.2-cm) diameter arbor holes) of a vulcanized fiber backing having a thickness of 0.83 mm (33 mils) (obtained as DYNOS VULCANIZED FIBRE from DYNOS GmbH, Troisdorf, Germany) with 3.5 grams/disc (g/disc) of a make coat composition consisting of 49.15 parts by weight of Resole Phenolic Resin, 40.56 parts by weight of Filler, 0.1 part Surfactant 1, and 10.19 parts by weight of water. The discs were then electrostatically coated with 15.0 g/disc of Abrasive Particles CSAP1, and then 13.0 g/disc of a size coat composition consisting of 29.42 parts by weight of Resole Phenolic Resin, 50.65 parts by weight of Grinding Aid 1, 1.81 parts by weight of Surfactant 1, and 18.12 parts by weight of water. The discs were then heated at 90° C. for 90 minutes. The partially-cured discs were then further coated with 10 grams of a supersize coat consisting of 30.96 parts by weight of Epoxy Resin, 56.34 parts by weight of Grinding Aid 2, 0.78 part Surfactant 2, 0.36 part Curing Agent, 0.04 part Anti-foam, and 11.52 parts by weight of water. Following curing at 102° C. for 10 hours, the resultant abrasive discs were flexed.

Comparative Example B

The abrasive discs of Comparative Example B were prepared identically to those of Comparative Example A with the exception that the supersize coating was not applied.

Example 1

The abrasive discs of Example 1 were prepared identically to those of Comparative Example B, with the exception that Abrasive Particles CSAP2 were substituted for Abrasive Particles CSAP1.

Grinding Test

Abrasive discs of Example 1 and Comparative Examples A and B were tested using the following procedure.

Figure 8:
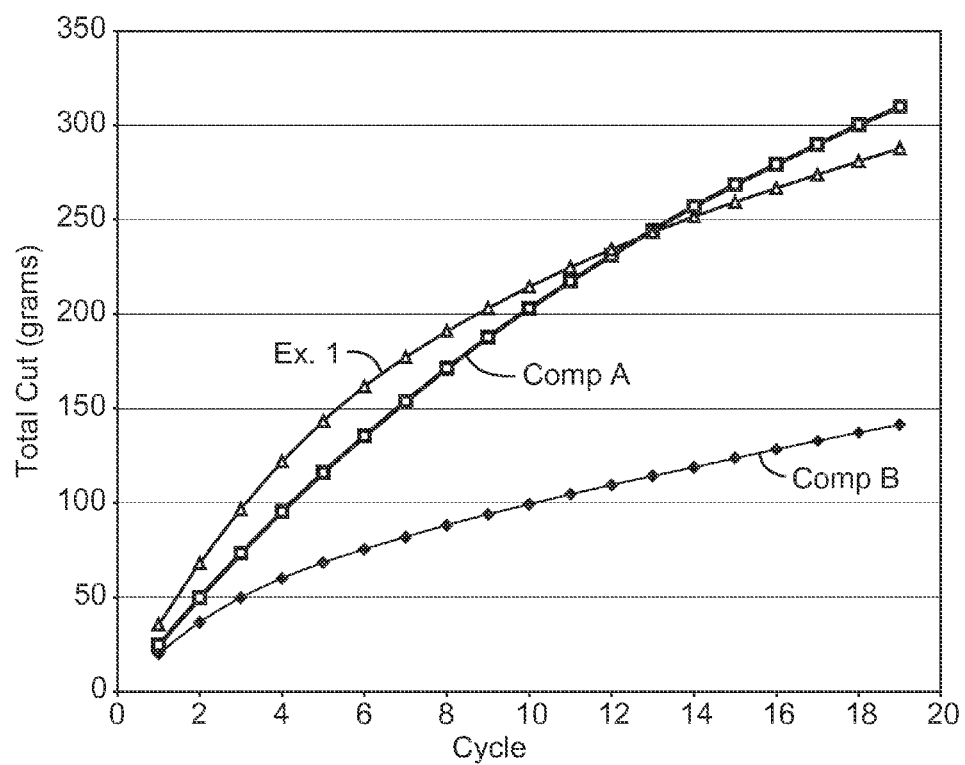
FIG. 8 is a plot of Total Cut versus Number of Cycles for Comparative Examples A and B and Example 1 using a 316 stainless steel bar as a workpiece.

7-inch (17.8-cm) diameter abrasive discs were attached to a rotary grinder fitted with a 7-inch (17.8-cm) ribbed disc pad face plate (80514 EXTRA HARD RED obtained from 3M Company, St. Paul, Minn.). The grinder was then activated and the abrasive disc was urged against an end face of a 0.75 in×0.75 in (1.9 cm×1.9 cm) cross-sectional area, pre-weighed, 304 stainless steel bar (workpiece) under a load of 12 lbs (5.5 kg). The resulting rotational speed of the grinder under this load and against this workpiece was 5000 rpm. The workpiece was abraded under these conditions for a total of twenty (20) 10-second grinding intervals (cycles). Following each 10-second cycle, the workpiece was allowed to cool to room temperature and weighed to determine the amount of steel removed. Test results (average of 4 discs) were reported as the total cut in FIG. 8.

Figure 9:
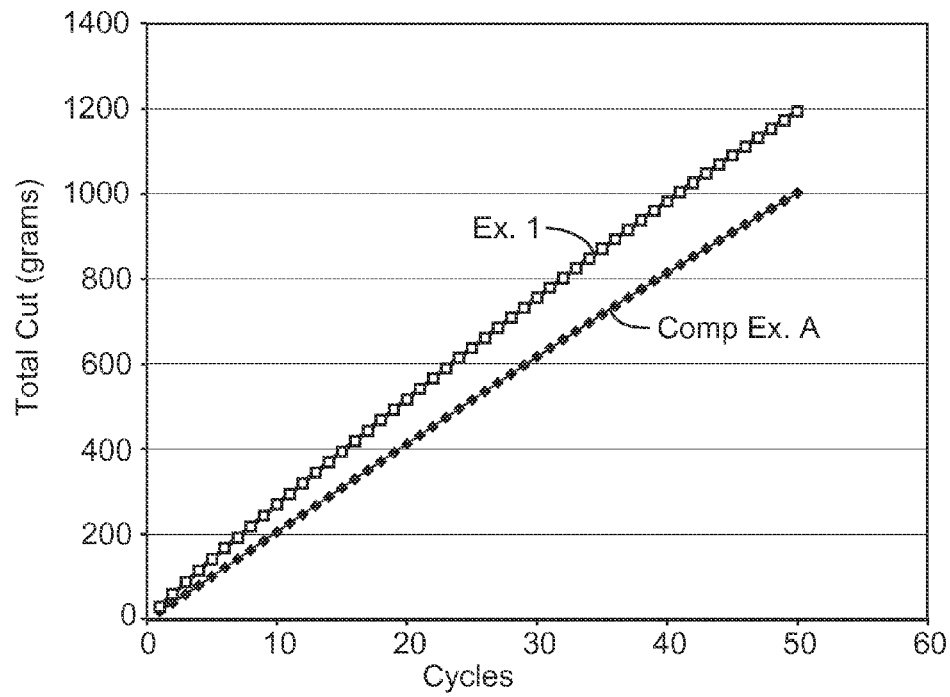
FIG. 9 is a plot of Total Cut versus Number of Cycles for Comparative Examples A and B and Example 1 using a 1045 carbon steel bar as a workpiece.
Figure 10:
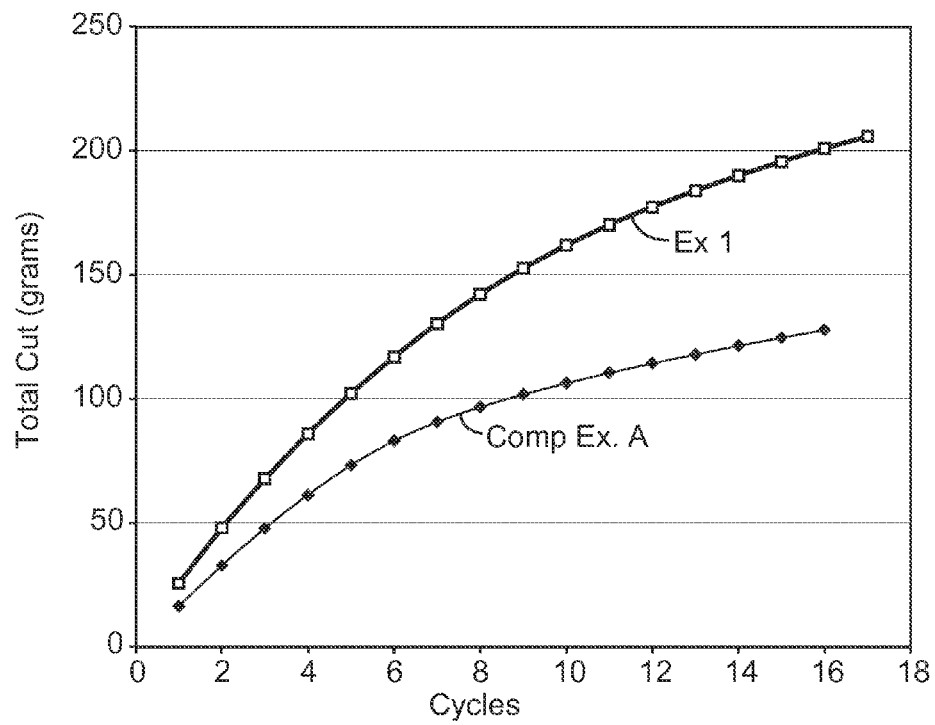
FIG. 10 is a plot of Total Cut versus Number of Cycles for Comparative Examples A and B and Example 1 using a 716 INCONEL alloy bar as a workpiece.

The Grinding Test was repeated with a 1045 carbon steel workpiece (carried out for 50 cycles, results reported in FIG. 9) and a 716 INCONEL alloy workpiece (carried out for 16 cycles, results reported in FIG. 10).

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A ceramic shaped abrasive particle bounded by:
   a base surface having a perimeter;
   contiguous sidewalls abutting the perimeter, wherein each of the contiguous sidewalls abuts the perimeter, wherein collectively the contiguous sidewalls abut the perimeter in its entirety, and wherein adjacent pairs of the contiguous sidewalls abut each other along respective corner edges; and
   a multifaceted surface comprising contiguous facets, wherein the multifaceted surface is spaced apart from the base surface by the contiguous sidewalls, and wherein at least one V-shaped groove extends from a first one of the corner edges across the multifaceted surface to one of the contiguous sidewalls that does not contact the first one of the corner edges;
   wherein the ceramic shaped abrasive particle consists of ceramic material, and wherein, on a total area basis, less than ten percent of the multifaceted surface is parallel to the base surface.

2. The ceramic shaped abrasive particle of claim 1, wherein the base surface is substantially planar.

3. The ceramic shaped abrasive particle of claim 1, wherein the base surface is trigonal.

4. The ceramic shaped abrasive particle of claim 1, wherein said at least one V-shaped groove comprises at least three V-shaped grooves that intersect at a common point.

5. The ceramic shaped abrasive particle of claim 1, wherein on a total area basis less than one percent of the multifaceted surface is parallel to the base surface.

6. The ceramic shaped abrasive particle of claim 1, wherein none of the multifaceted surface is parallel to the base surface.

7. The ceramic shaped abrasive particle of claim 1, wherein the multifaceted surface comprises at least four times as many of the contiguous facets as there are of the contiguous sidewalls.

8. The ceramic shaped abrasive particle of claim 1, wherein the multifaceted surface and the contiguous sidewalls collectively define at least six cusps.

9. The ceramic shaped abrasive particle of claim 1, wherein the multifaceted surface is composed of the contiguous facets.

10. The ceramic shaped abrasive particle of claim 1, wherein at least the multifaceted surface is formed by a molding process.

11. The ceramic shaped abrasive particle of claim 1, wherein the contiguous sidewalls taper inwardly as they extend away from the base surface.

12. The ceramic shaped abrasive particle of claim 1, wherein the ceramic shaped abrasive particle comprises alpha alumina.

13. A plurality of ceramic shaped abrasive particles according to claim 1.

14. The plurality of ceramic shaped abrasive particles according to claim 13 having a size distribution corresponding to at least one of an abrasives industry specified nominal grade or a nominal screened grade.

15. A coated abrasive article comprising a plurality of ceramic shaped abrasive particles according to claim 13.

16. The coated abrasive article of claim 15, further comprising:
   a make layer at least partially disposed on the backing; and
   a size layer at least partially disposed on the make layer.

17. The coated abrasive article of claim 15, wherein the coated abrasive article further comprises a supersize layer at least partially disposed on the size layer, and wherein the supersize layer comprises a grinding aid.

18. The coated abrasive article of claim 15, wherein the coated abrasive article is free of a supersize layer comprising a grinding aid.

19. The coated abrasive article of claim 15, wherein the coated abrasive article is free of grinding aid.

* * * * *